No. 710,009. Patented Sept. 30, 1902.
L. ROBERTSON.
WARDROBE.
(Application filed Mar. 26, 1901.)
(No Model.) 5 Sheets—Sheet 1.
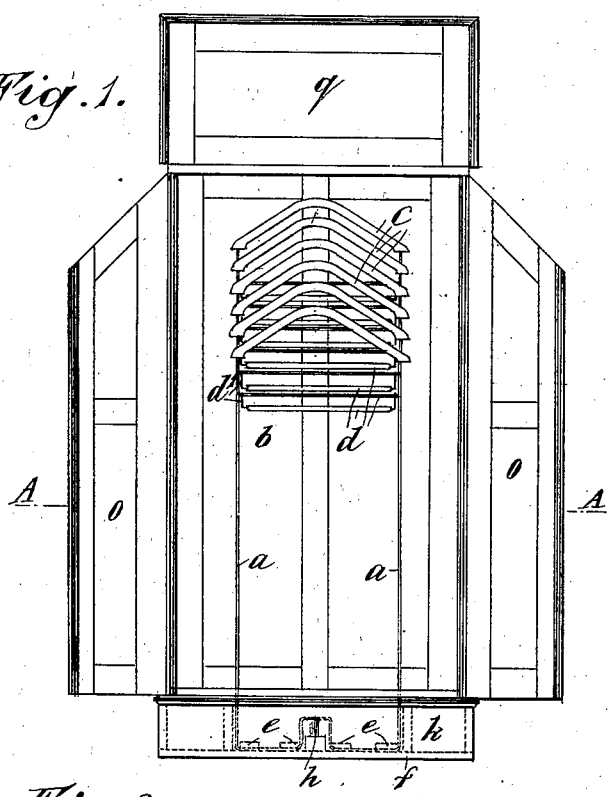
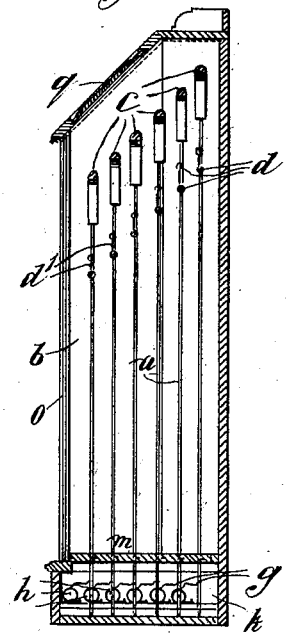
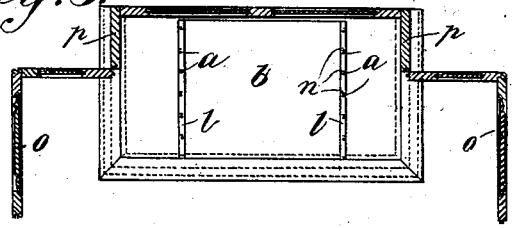
Witnesses:—
C. F. Babcock
R. W. Bishop
Inventor,
Lennox Robertson,
By Davis & Davis,
Attorneys.

No. 710,009. Patented Sept. 30, 1902.
L. ROBERTSON.
WARDROBE.
(Application filed Mar. 26, 1901.)
(No Model.)
5 Sheets—Sheet 2.
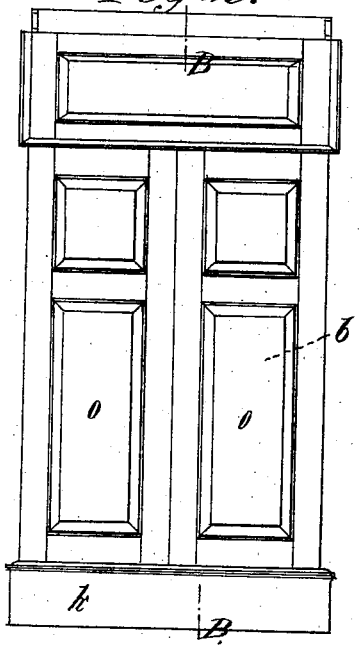
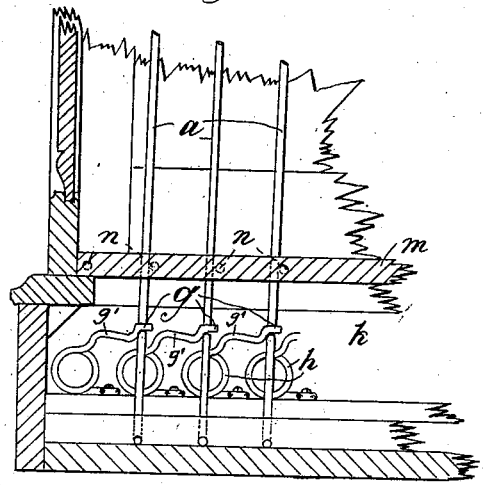
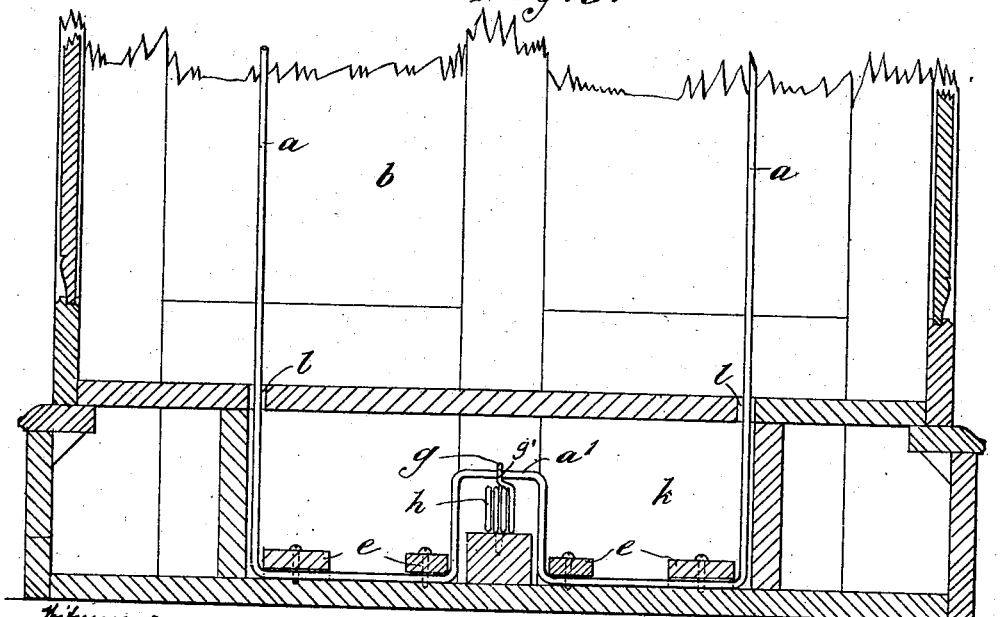

No. 710,009. Patented Sept. 30, 1902.
L. ROBERTSON.
WARDROBE.
(Application filed Mar. 26, 1901.)
(No Model.) 5 Sheets—Sheet 3.

No. 710,009. Patented Sept. 30, 1902.
L. ROBERTSON.
WARDROBE.
(Application filed Mar. 26, 1901.)

(No Model.) 5 Sheets—Sheet 4.

No. 710,009. Patented Sept. 30, 1902.
L. ROBERTSON.
WARDROBE.
(Application filed Mar. 26, 1901.)
(No Model.) 5 Sheets—Sheet 5.
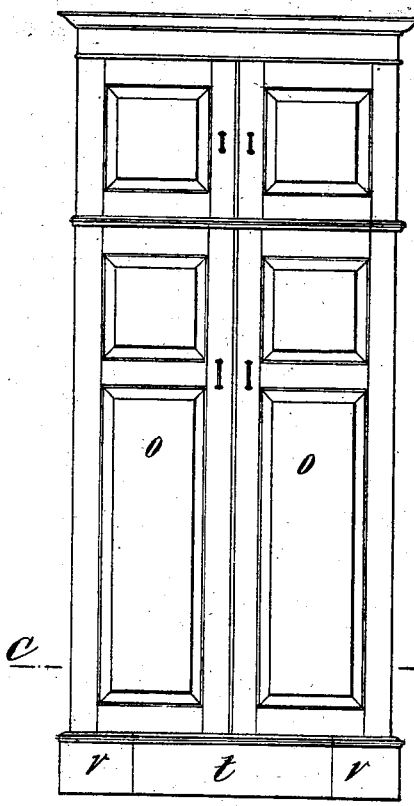
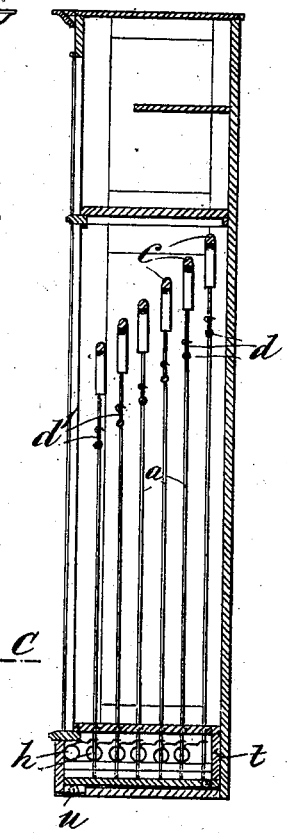
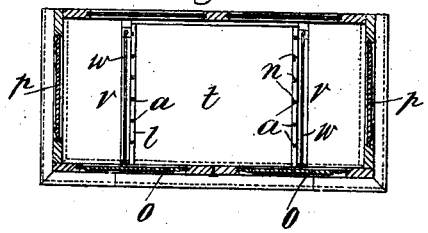
Witnesses:—
E. F. Babcock
R. W. Bishop
Inventor,
Lennox Robertson,
By Davis & Davis,
Attorneys.

UNITED STATES PATENT OFFICE.

LENNOX ROBERTSON, OF PENARTH, ENGLAND.

WARDROBE.

SPECIFICATION forming part of Letters Patent No. 710,009, dated September 30, 1902.

Application filed March 26, 1901. Serial No. 52,957. (No model.)

*To all whom it may concern:*

Be it known that I, LENNOX ROBERTSON, a subject of the King of Great Britain and Ireland, residing at Penarth, England, have invented Improvements in or Relating to Wardrobes, of which the following is a specification.

This invention of improvements in or relating to wardrobes has for object to enable garments—such, for example, as gentlemen's coats, vests, and trousers—to be supported or suspended in such a way that while not occupying much room they will not be liable to be crushed or unduly pressed and that access can be easily gained to any particular garment without necessarily removing or disturbing the others. For this purpose a wardrobe according to this invention is constructed with a convenient number of light frames or supports that are arranged in a vertical or approximately vertical position one in front of the other at a suitable distance apart and serve to carry garments—such as coats, vests, and trousers—and are supported at their lower ends in such a way that while they are normally held in a vertical or approximately vertical position each of them can be moved forward into an inclined position, so that any one or more of them can be moved forward to enable any garment to be removed without removing or disturbing the others on their supports.

Figure 7:
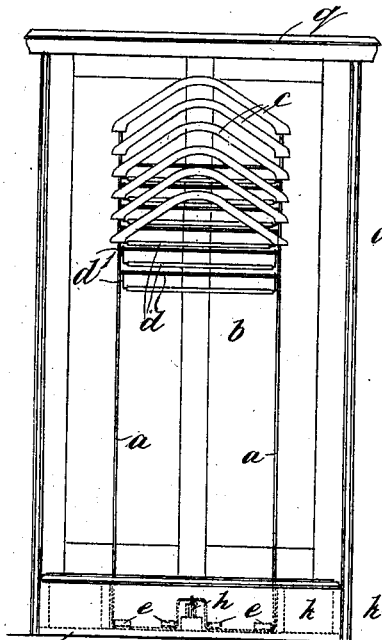
Figure 10:
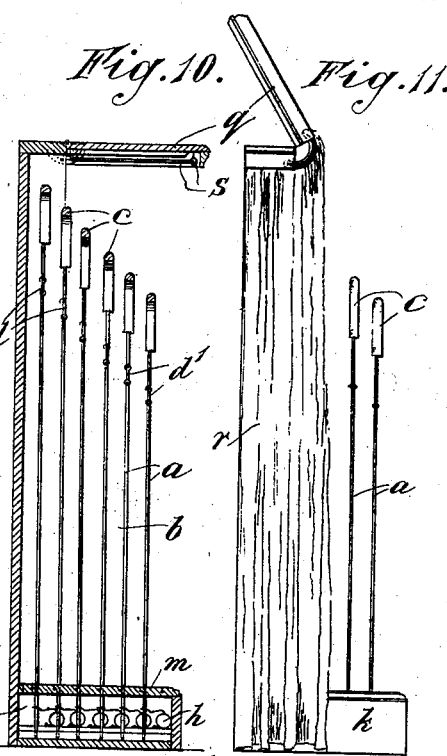
Figure 11:
Figure 9:
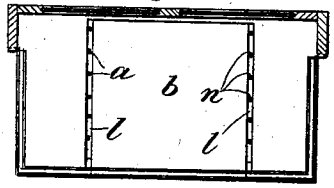
Figure 8:
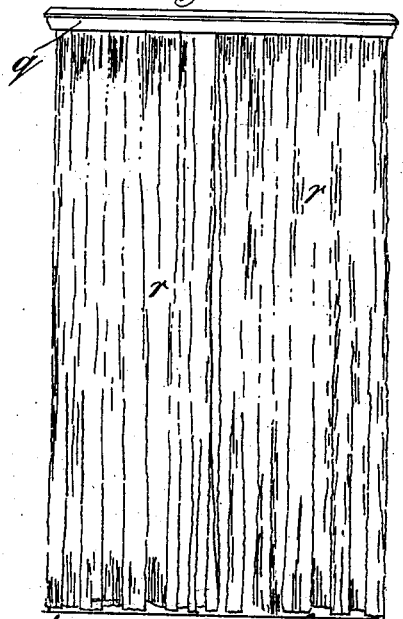
Figure 12:
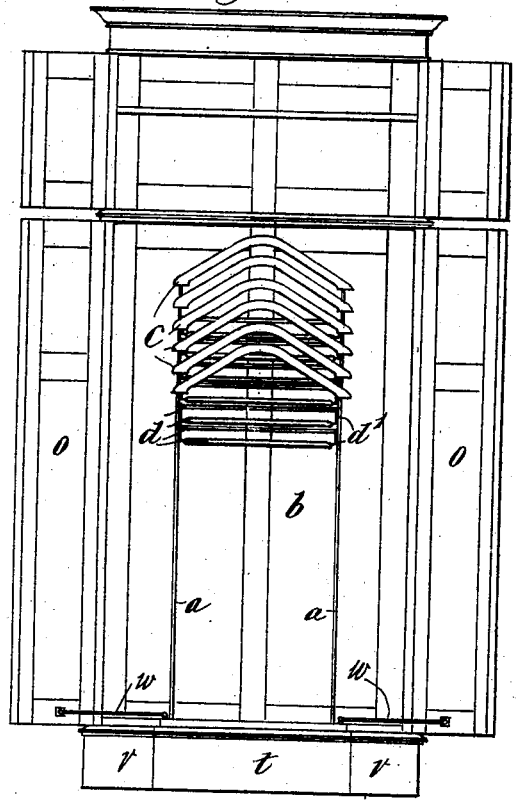
Figure 16:
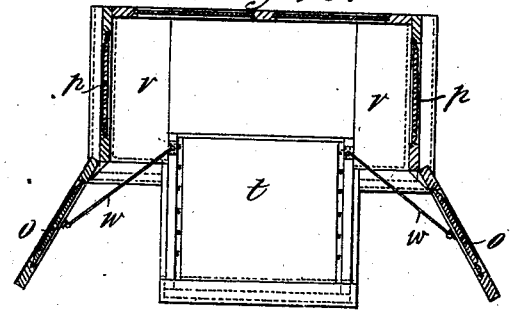

Figures 1 to 6, inclusive, show one construction of wardrobe with movable garment-supports applied thereto. Figs. 1 and 2 show the wardrobe open and closed, respectively, and Figs. 3 and 4 are sections taken, respectively, on the line A A of Fig. 1 and the line B B of Fig. 2. Figs. 5 and 6 are sectional views taken at right angles to each other and drawn to a larger scale than Figs. 1 to 4, showing one arrangement for mounting and holding the lower ends of the garment-supports. Figs. 7, 8, 9, and 10 are similar views to Figs. 1, 2, 3, and 4, respectively, showing a modified construction of wardrobe provided with movable garment-supports according to this invention. Fig. 11 is a side view of the wardrobe when opened. Figs. 12, 13, 14, and 15 are similar views to Figs. 1, 2, 3, and 4, respectively, showing a further construction of wardrobe with movable garment-supports. Fig. 16 is a horizontal section on the line C C of Fig. 13, but showing the wardrobe open.

$a$ represents the vertical garment-supports arranged within the wardrobe $b$ one in front of the other at a suitable distance apart—say two or three inches—and in a vertical or nearly vertical position. Each of these supports may conveniently comprise a light metal rod bent approximately to a U shape and provided at the top with a headpiece $c$, of wood, shaped to approximately fit the shoulder portion of a coat or waistcoat and at a lower part with one or more horizontal rods $d$, over one or other of which trousers can be placed and supported, each garment-support to the rear being made about one or two inches higher than the one in front of it in order to prevent the collars of coats suspended on adjacent garment-supports from crushing each other. When one rod $d$ only is used, it may be of wood. When two are used, the upper one may be of iron or other metal and the lower one be of wood and be suitably suspended from the upper one, as by hooks $d'$.

Each garment-support $a$ in the example shown is mounted to turn in bearings $e$, fixed to the base $f$ of the wardrobe, and is held in the vertical position by a coiled spring $h$, one end of which is bent, as shown at $g$ and $g'$, (see Figs. 5 and 6,) to engage the bent central portion $a'$ of the lower end of the garment-support and the other end of which is fixed to the base $f$.

In the example shown the lower ends of the several garment-supports $a$ and their bearings $e$ and springs $g$, $g'$, and $h$ are inclosed in the lower box-like portion $k$ of the wardrobe, and the vertical side portions of the garment-supports extend upward through transverse slots $l$, which are formed in the top $m$ of the said box-like portion $k$ and are provided with transverse pins $n$, that serve to limit the extent to which the garment-supports can be inclined forward and moved backward. The arrangement is such that normally the bent end $g$ of each spring will hold the corresponding garment-support $a$ firmly in a vertical or practically vertical position against the pin $n$ behind it, but will nevertheless admit of such support being pulled forward into an inclined position, in which it will be held against the pin *n* in front of it by the bent portion *g'* of the spring and that the said garment-support can afterward be returned into the vertical or practically vertical position and be again held in that position by the bent end *g* of the said spring.

Movable garment-supports according to this invention can be applied to wardrobes of different shapes. In Figs. 1 to 4 they are shown applied to a wardrobe *b*, having a pair of folding doors *o* hinged or fixed to the sides *p* of the wardrobe, parts of which are also hinged so as to be capable of being moved outward, as shown in Fig. 3, the top *q* of the wardrobe being also hinged to open upward.

In Figs. 7 to 11, inclusive, the front and portions of the sides of the wardrobe are formed by a pair of curtains *r*, that are supported at the top upon rods *s*, along which they can be moved when it is desired to open the wardrobe and expose the garment-supports and the garments thereon. The back and remaining portions of the sides of the wardrobe are of wood and the top *q* of wood hinged to turn upward.

In Figs. 12 to 16, inclusive, the lower ends of the garment-supports *a* are mounted within a box-like transversely-movable base or carrier *t*, provided at its lower side with rollers *u* and arranged to move in and out of the wardrobe *b* between suitable guides *v*, so that it and the garment-supports *a* and the garments thereon can be readily withdrawn from the wardrobe and replaced therein. In the example shown the movable base or carrier *t* is connected by links *w* to the folding doors *o*, so that on these doors being opened the base or carrier and attached parts will be simultaneously drawn outward, Fig. 14, and on the doors being closed the base or carrier and attached parts will be pushed inward, Fig. 16.

What I claim is—

1. In a wardrobe, a plurality of upwardly-extending oscillatory garment-supports arranged one in front of the other, having their lower ends mounted in the lower part of said wardrobe and each capable of being turned into a forward and backward position and means for normally holding said garment-supports in a vertical position, substantially as described.

2. A wardrobe having a hollow box-like lower portion, a plurality of upwardly-extending garment-supports arranged one in front of the other and having their lower ends mounted in bearings in said hollow lower portion of the wardrobe and capable of being turned into a forward or backward position, at will, and means for normally holding said garment-supports in the backward and upright position.

3. In a wardrobe, a plurality of upwardly-extending garment-supports arranged one in front of the other and having their lower ends journaled in the lower part of said wardrobe and each capable of being turned inward and outward, and means for holding each of said garment-supports in its vertical and inclined positions.

4. A wardrobe having a hollow lower portion the top of which is formed with transverse slots, a plurality of upwardly-extending garment-supports arranged one in front of the other and having their lower ends mounted to turn in said hollow lower portion and their upper portions extending through said slots and capable of being turned backward and forward therein, and means for holding said supports in a yielding manner in their normal position.

5. In a wardrobe, a plurality of normally vertical garment-supports arranged one in front of the other and each mounted at its lower end to turn about a horizontal axis, and springs adapted to hold each garment-support in position but so as to allow of its being pulled forward into an inclined position and of its being returned to the vertical position, substantially as described.

6. In a wardrobe, a plurality of normally vertical garment-supports made of different heights, arranged one in front of the other, supported at their lower ends on the lower portion or base of said wardrobe and capable of being turned inward and outward, means for limiting the extent of inward and outward motion of said garment-supports, and means for holding each of said garment-supports in its vertical and inclined positions.

7. A wardrobe having a hollow lower portion the top of which is formed with transverse slots, a plurality of normally vertical garment-supports arranged one in front of the other and of gradually-increasing height from front to back, each of said garment-supports having its lower end mounted in said hollow lower portion and its sides extending upwardly through said slots and capable of being turned inward and outward, and means for holding each of said garment-supports in the position into which it is moved.

8. In a wardrobe, a plurality of normally vertical garment-supports each comprising a frame mounted to turn about a horizontal axis at its lower end and provided at the top with a headpiece adapted to support a garment such as a coat and with one or more lower horizontal rods, and means for normally holding each of said garment-supports in a vertical postion while allowing of its being tilted forward into an inclined position, substantially as described.

9. In a wardrobe, a plurality of normally vertical garment-supports each comprising a frame provided with one or more cross-rods, bearings in which the lower ends of said supports are mounted to turn about a horizontal axis, and springs engaging the lower ends of said garment-supports and adapted to hold the latter in a vertical position while allowing of their being pulled forward into an inclined position, substantially as described.

10. A wardrobe having a hollow lower portion that is arranged to move transversly in and out of said wardrobe, a plurality of upward-extending garment-supports arranged one in front of the other and having their lower ends supported on said movable lower portion and capable of being turned inward and outward, and means carried by said hollow lower portion for holding said garment-supports in position for use, substantially as described.

11. A garment-support having a hollow lower box-like portion that is arranged to move transversely in and out of the wardrobe and has its top formed with transverse slots, a plurality of garment-supports extending upwardly through said slots and having their lower ends mounted to turn in said box-like lower portion, and means for holding said garment-supports in position for use, substantially as described.

12. A wardrobe having folding doors at the front and a hollow box-like lower portion that is arranged to move transversely in and out of said wardrobe and formed with transverse slots in its top part, a plurality of garment-supports having their side members extending upwardly through said slots and their lower portions mounted to turn in said movable box-like lower portion and capable of being turned inward and outward in said slots, means for holding said garment-supports in position for use, and means connecting said movable lower portion of the wardrobe to the doors of said wardrobe and adapted to move the said lower portion outward and inward respectively when said doors are opened and closed, substantially as described.

Signed at 77 Cornhill, London, E. C., this 11th day of March, 1901.

LENNOX ROBERTSON.

Witnesses:
WM. O. BROWN,
HUGH HUGHES.